(12) United States Patent
Sutton et al.

(10) Patent No.: US 11,252,123 B2
(45) Date of Patent: Feb. 15, 2022

(54) CLASSIFYING SOCIAL ENTITIES AND APPLYING UNIQUE POLICIES ON SOCIAL ENTITIES BASED ON CROWD-SOURCED DATA

(71) Applicant: Proofpoint, Inc., Sunnyvale, CA (US)

(72) Inventors: Richard Banks Sutton, San Mateo, CA (US); Daniel Oshiro Nadir, Carlsbad, CA (US); Devin Hugh Redmond, Encinitas, CA (US); Harold Nguyen, Burlingame, CA (US); Anthony Lawrence Dorie, San Francisco, CA (US); Jorge Iriso, Alameda, CA (US); Wenchang Yan, Burlingame, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 245 days.

(21) Appl. No.: 16/681,486

(22) Filed: Nov. 12, 2019

(65) Prior Publication Data

US 2020/0084174 A1    Mar. 12, 2020

Related U.S. Application Data

(63) Continuation of application No. 16/019,428, filed on Jun. 26, 2018, now Pat. No. 10,511,562, which is a continuation of application No. 14/306,098, filed on Jun. 16, 2014, now Pat. No. 10,033,684.

(60) Provisional application No. 61/867,004, filed on Aug. 16, 2013.

(51) Int. Cl.
*G06F 16/00* (2019.01)
*H04L 12/58* (2006.01)
*H04L 29/08* (2006.01)
*G06F 16/35* (2019.01)
*G06Q 50/00* (2012.01)

(52) U.S. Cl.
CPC .............. *H04L 51/32* (2013.01); *G06F 16/35* (2019.01); *G06Q 50/01* (2013.01); *H04L 51/12* (2013.01); *H04L 67/22* (2013.01)

(58) Field of Classification Search
None
See application file for complete search history.

(56) References Cited

U.S. PATENT DOCUMENTS

| 8,412,770 | B2 | 4/2013 | Marcucci |
| 8,621,215 | B1 | 12/2013 | Iyer |
| 8,668,590 | B2 | 3/2014 | Barclay |
| 8,788,442 | B1 | 7/2014 | Sculley, II et al. |
| 9,037,653 | B2 | 5/2015 | Wiseman |
| 9,043,417 | B1 | 5/2015 | Jones et al. |

(Continued)

OTHER PUBLICATIONS

Office Action for U.S. Appl. No. 13/844,178, dated Jan. 14, 2015, 9 pgs.

(Continued)

*Primary Examiner* — Anhtai V Tran
(74) *Attorney, Agent, or Firm* — Sprinkle IP Law Group

(57) ABSTRACT

Technology is disclosed for detecting, classifying, and/or enforcing rules on social networking activity. The technology can scan and collect social content data from one or more social networks, store the social content data, classify content data posted to a social network, create and apply a set of social data content rules to future posted social content data.

20 Claims, 4 Drawing Sheets

(56) References Cited

U.S. PATENT DOCUMENTS

| | | | |
|---|---|---|---|
| 9,105,039 B2 | 8/2015 | Kramer | |
| 9,118,689 B1 | 8/2015 | Apte | |
| 9,262,610 B2 | 2/2016 | Lessin et al. | |
| 9,286,378 B1 | 3/2016 | Zarakhovsky | |
| 9,369,433 B1 | 6/2016 | Paul et al. | |
| 9,400,999 B2 | 7/2016 | Sutton | |
| 10,033,684 B2 | 7/2018 | Sutton | |
| 10,511,562 B2 | 12/2019 | Sutton | |
| 10,528,611 B2 | 1/2020 | Sutton | |
| 2007/0190504 A1 | 8/2007 | Schwartz | |
| 2008/0189380 A1* | 8/2008 | Bosworth | H04L 67/22 709/207 |
| 2010/0153175 A1 | 6/2010 | Pearson et al. | |
| 2011/0113096 A1 | 5/2011 | Long | |
| 2011/0213646 A1 | 9/2011 | Ali | |
| 2011/0276513 A1 | 11/2011 | Erhart et al. | |
| 2011/0321132 A1 | 12/2011 | Slingerland | |
| 2012/0066259 A1 | 3/2012 | Huber | |
| 2012/0089451 A1 | 4/2012 | Agramonte | |
| 2012/0124202 A1 | 5/2012 | Cooper | |
| 2012/0150772 A1 | 6/2012 | Paek | |
| 2012/0233265 A1 | 9/2012 | Joy | |
| 2012/0239486 A1 | 9/2012 | Hu | |
| 2013/0018965 A1* | 1/2013 | Ramachandran | G06Q 10/107 709/206 |
| 2013/0046826 A1 | 2/2013 | Stanton | |
| 2013/0060864 A1 | 3/2013 | Ehms | |
| 2013/0086641 A1* | 4/2013 | Mehr | B05B 11/3053 726/4 |
| 2013/0139224 A1 | 5/2013 | Wehmeier et al. | |
| 2013/0198275 A1 | 8/2013 | Forsblom | |
| 2013/0263206 A1 | 10/2013 | Nefedov | |
| 2014/0012738 A1 | 1/2014 | Woo | |
| 2014/0040170 A1 | 2/2014 | Zheng et al. | |
| 2014/0108946 A1 | 4/2014 | Olofsson | |
| 2014/0115181 A1 | 4/2014 | Wu | |
| 2014/0136492 A1 | 5/2014 | Lerios | |
| 2016/0335344 A1 | 11/2016 | Sutton et al. | |
| 2018/0309710 A1 | 10/2018 | Sutton et al. | |
| 2019/0124109 A1 | 4/2019 | Foster | |
| 2020/0133969 A1 | 4/2020 | Sutton | |
| 2021/0303611 A1 | 9/2021 | Sutton | |

OTHER PUBLICATIONS

Office Action for U.S. Appl. No. 13/844,178, dated Sep. 25, 2015, 11 pgs.

Office Action for U.S. Appl. No. 14/306,098, dated Aug. 9, 2016, 17 pgs.

Office Action for U.S. Appl. No. 14/306,098, dated Apr. 28, 2017, 16 pgs.

Office Action for U.S. Appl. No. 14/306,098, dated Sep. 27, 2017, 18 pgs.

International Search Report and Written Opinion for International Patent Application No. PCT/US2017/036594, dated Sep. 1, 2017, 7 pgs.

Office Action for U.S. Appl. No. 16/019,428, dated Oct. 18, 2018, 6 pgs.

Office Action for U.S. Appl. No. 15/218,817, dated Apr. 12, 2019, 9 pgs.

Notice of Allowance for U.S. Appl. No. 16/019,428, dated May 2, 2019, 4 pgs.

Notice of Allowance for U.S. Appl. No. 16/019,428, dated Aug. 5, 2019, 4 pgs.

Notice of Allowance for U.S. Appl. No. 15/218,817, dated Sep. 3, 2019, 5 pgs.

Notice of Allowance for U.S. Appl. No. 16/019,428, dated Oct. 21, 2019, 4 pgs.

Office Action for U.S. Appl. No. 16/730,745, dated Aug. 19, 2020, 6 pgs.

* cited by examiner

Content Incidents

Policy Ctegories: PII, Spam

Phinneas Bloggs
Comment on 05/02/13 2:41:45 PM

WARNING: Your account is reported to have violated the policies that are considered annoying or insulting Facebook users. System will disable your account within 24 hours if you do not do the reconfirmation. Please confirm your facebook account below. Thanks, The Facebook Security Team Inc., Department 415 P.O. Box 10005 Palo Alto CA 94303

See less
View on Facebook | Posted via Web

Detected Action(s):

Show Parent | Actions ▼

- ADD TO COMMENTER WATCH LIST
- ADD TO COMMENTER BLOCK LIST
- POST RESPONSE
- REMOVE FROM FACEBOOK
- IGNORE INCIDENT
- IGNORE ALL LIKE THIS

*FIG. 4*

CLASSIFYING SOCIAL ENTITIES AND APPLYING UNIQUE POLICIES ON SOCIAL ENTITIES BASED ON CROWD-SOURCED DATA

CROSS-REFERENCE TO RELATED APPLICATIONS

This application is a continuation of U.S. patent application Ser. No. 16/019,428, filed Jun. 26, 2018, entitled "CLASSIFYING SOCIAL ENTITIES AND APPLYING UNIQUE POLICIES ON SOCIAL ENTITIES BASED ON CROWD-SOURCED DATA," which is a continuation of U.S. patent application Ser. No. 14/306,098, filed Jun. 16, 2014, now U.S. Pat. No. 10,033,684, entitled "CLASSIFYING SOCIAL ENTITIES AND APPLYING UNIQUE POLICIES ON SOCIAL ENTITIES BASED ON CROWD-SOURCED DATA," which claims a benefit of priority from U.S. Provisional Application No. 61/867,004, filed Aug. 16, 2013, entitled "CLASSIFYING SOCIAL ENTITIES AND APPLYING UNIQUE POLICIES ON SOCIAL ENTITIES BASED ON CROWD-SOURCED DATA," each of which is incorporated by reference herein in its entirety.

BACKGROUND

Social networking platforms and networks, including, e.g., FACEBOOK, GOOGLE+, LINKEDIN, TWITTER, YOUTUBE, XING, and many others, are commonly employed by millions of users. They have become so pervasive that they are now commonly used even by organizations and other commercial enterprises to advertise as well as communicate with their target audiences on behalf of the organizations. (The social networking platforms named in this application may be registered or common law trademarks of entities unrelated to the applicant. Applicant makes no claim of ownership over any such trademarks.)

A social account (or simply "account") is an account on one or more social networking platforms ("social network"). An account can be associated with an individual (e.g., a natural person) or it can be associated with an organization (e.g., created by an employee of the organization) for broadcasting information about the organization or its products or services. Creating accounts on these social networks is relatively simple and users can create a "presence" on the social networks for themselves, their products, their brands and/or their initiatives. To present a consistent social identity across social networking platforms, individuals and organizations can create a social account on each social networking platform using similar or identical names, pictures and descriptions. The individual or organization can then broadcast similar or identical content across multiple or even all of their social accounts to reach the audiences or constituents on each social networking platform to which they are connected.

Similarly, an individual or organization can create multiple social accounts on the same social networking platform to represent different products or "personas." Even though these social accounts may appear to be different, the same person or representative of a company or other entity can control, configure and post content using these accounts.

Individuals or companies attempting to engage in "bad" activity ("fraudulent users") on a social networking platform can attempt to evade detection by creating multiple social accounts ("fake social accounts") on this social networking platform that appear to represent non-malicious or real-world identities. Examples of bad activity include, e.g., violating social networking platforms' rules regarding terms of use, abusive online behavior, violating laws, etc. These malicious individuals or companies can then interact with legitimate social accounts on social networking platforms via one or more of these fake social accounts with malicious intent, e.g., abusing, bullying, exploiting, harming, infecting (e.g., with malware or viruses), or stealing from the legitimate social accounts.

To operate at a high scale, these fraudulent users may write software programs, commonly called "bots", that automate the creation of multiple social accounts and the publishing of social content using those accounts. This technique is most often used to spread to legitimate social users spam, malware, or other abusive or malicious content, who then may read or potentially act upon the content.

Social networks generally have programmatic application program interfaces (APIs) that enable third party applications ("social applications" or simply "applications") to integrate with the social networks and provide additional services for the social networks' users. Through these APIs, social networks provide additional services for the social network's users. These APIs provide access to public data within the social network. Access to private data may also be allowed if it is granted by the social account that owns that data.

BRIEF DESCRIPTION OF THE DRAWINGS

FIG. 4 is a user interface diagram illustrating a user interface for enabling users to apply specified content rules to a particular social data entry and/or a commenter in accordance with embodiments of the technology.

DETAILED DESCRIPTION

Technology is disclosed that creates and enforces rules for classifying social data, such as crowd-sourced data, on a social networking platform based on activity observed on that social networking platform or other social networking platforms. In various embodiments, social data comprises social entities and any associated metadata. Social entities are activities by social accounts, attributes associated with social accounts, or social accounts themselves. Examples of social entities can include posts, tweets, account names, account attributes (e.g., e-mail address, phone number, etc.), comments, language used, videos, photos, etc. In various embodiments, the technology observes social data relating to a particular social account associated with a particular social networking platform to compute a classification on an entity observed on that social account, or on a different social account, associated with either the same or different social networking platform. The technology can then employ the computed classification to provide sets of rules and policies that can be applied to the particular social account or multiple social accounts. The rules can identify actions to be taken on social entities, e.g., to report, log, alert, block, remove, and/or remediate the social entities.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Figure 1:
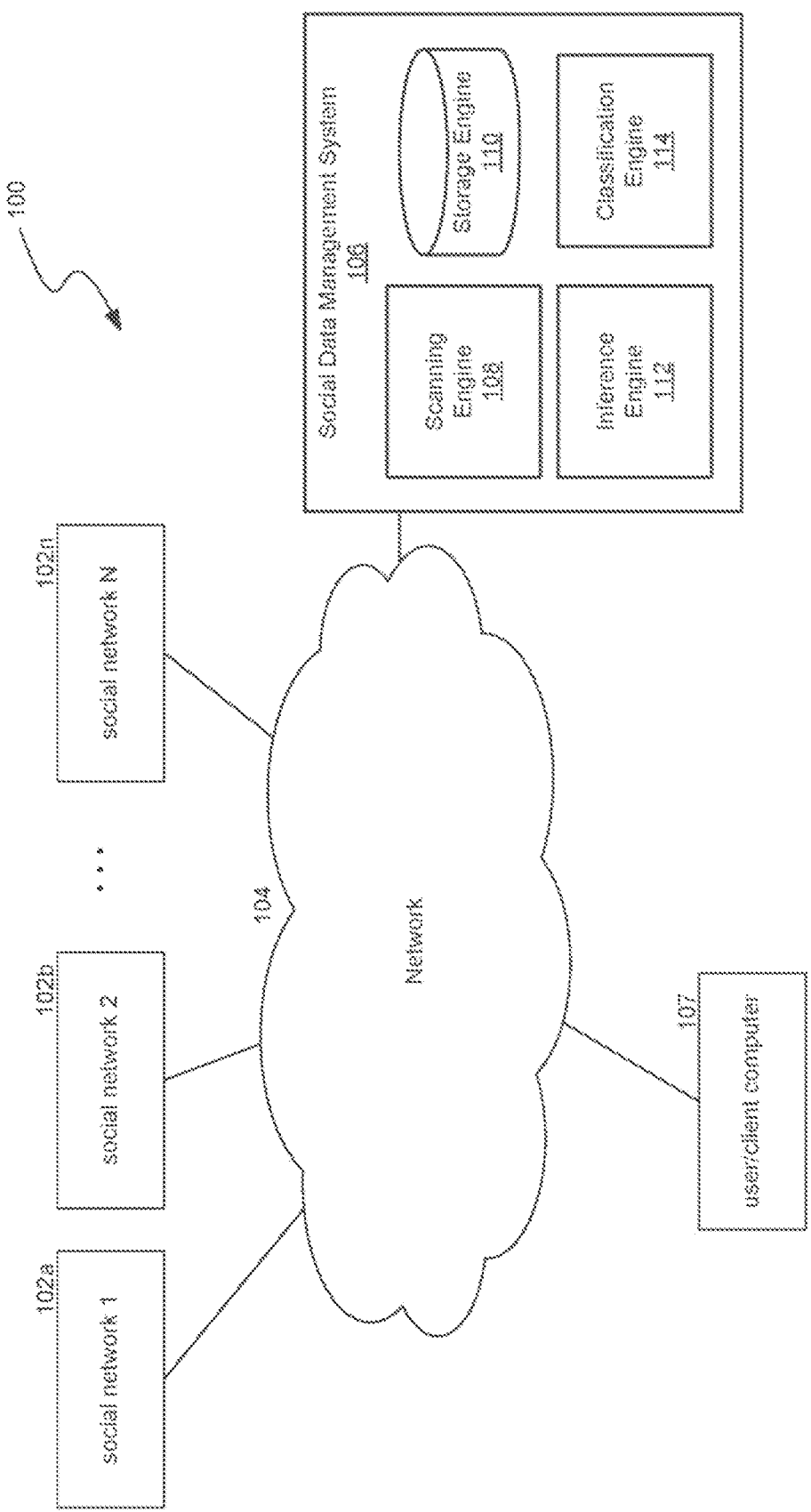
FIG. 1 is a block diagram illustrating various components of the disclosed technology.

FIG. 1 is a schematic block diagram illustrating an environment 100 in which the technology may operate in various embodiments. The environment can include one or more social networks 102 (individually identified as social network 1 102A, social network 2 102B, and social network 3 102N). Examples of social networks can include, but is not limited to, FACEBOOK, PINTEREST, TWITTER, GOOGLE+, YOUTUBE, LINKEDIN, etc. The social networks 102 may be communicatively coupled via a network 104 (e.g., an intranet, the Internet, etc.) with a social data management system 106 ("system 106") associated with the technology and one or more client computing devices 107.

In some embodiments, the system 106 includes a: (1) a scanning engine 108, which is composed of one or more processes, that collects social data from a plurality of social networks via the social networks' APIs; (2) a storage engine 110 that stores social data, e.g., outside of the social network it was observed on; (3) an inference engine 112, which is composed of one or more processes, that analyzes social data in order to build rules to classify new social data; and (4) a classification engine 114, which is composed of one or more processes, that applies the newly inferred rules to new social data while or soon after this new social data is observed. In some embodiments, the scanning engine 108, storage engine 110, inference engine 112 and classification engine 114 may be composed of either a single process or multiple processes that implement a combination of subsets of functionality for each component. The system 106 can further include a user interface for applying rules and policies to a social account or across social accounts leveraging classifications of the system. In operation, the functionality of the engines 108, 110, 112, 114 can be exposed via the user interface for use on a social account or across multiple social accounts.

In some embodiments of the technology, the inference engine 112 builds a list of social accounts that are known to publish social data that are classified as "spam," e.g., undesirable content. The inference engine 112 evaluates the percentage of overall posts and comments seen from a first social account that were classified as spam, and the number of additional social accounts (e.g., a second social account, a third social account, etc.) on which that spam content was posted. If the percentage of posts classified as spam and/or the number of social accounts the spam content was posted surpass specified (e.g., pre-determined) thresholds, it is determined that there exists an increased likelihood that the next posting of social data published from the first social account will also be spam.

The inference engine 112 is configured to instruct the classification engine 114 to take one or more actions, and to apply new rules to all social data classified by the system 106 regardless of which social account published the data and/or regardless of which social account the data was published to. In several embodiments, the inference engine 112 can inform the classification engine 114 to (1) consider all social data subsequently posted by the first social account as inappropriate; (2) change sensitivity to spam classification on subsequent social data posted by the first social account; (3) consider subsequent social data that is the same or similar to the social data posted by the first social account to be spam regardless of which other social account posts it (as described in further detail below); and/or (4) consider social data posted by other social accounts (e.g., a second social account, a third social account, etc.) that is the same or similar to the observed first social account as spam (as described in further detail below).

In one embodiment, the classification engine 114 is configured to determine the similarity of multiple social data, either on the same social networking platform or different social networking platforms, by comparing the metadata from those social data and looking for similarities. Such similarities can include, for example, one or more of: (1) lexicographical similarities as in a small Levenshtein distance; (2) chronologically close posting times; (3) use of the same third party publishing application; (4) geo location data that is physically close; (5) use of a similar URL characteristic (e.g., same URL, URLs that redirect to the same final location, URLs that link to the same URL domain or URLs that link to the same content hosted on different URL domains); (6) use of the same or similar images; and/or (7) multiple of these factors used in combination. In instances wherein the classification engine 114 concludes that a set of social data is similar, the classification engine 114 can consider that content equivalent for the purpose of choosing which rules from the inference engine 112 to apply to that content.

In some embodiments, the classification engine 114 can determine the similarity of multiple social accounts, either on the same social networking platform or different social networking platforms, e.g., by comparing the metadata from those accounts and looking for similarities. Such account similarities can include one or more of: (1) the profile images are identical or very similar; (2) the name, handle, or username used on the account is the same or very similar; (3) the date the accounts were created is chronologically close; (4) the geo location of the account or the posts on the account is the same or physical close; (5) identical content is published to each account at the same time; (6) the same third party applications are used to publish content to each account; and/or (7) multiple of these factors used in combination. In instances wherein the classification engine 114 concludes that a set of social accounts are similar, the classification engine 114 can consider those accounts to be equivalent for the purpose of choosing which rules from the inference engine 112 to apply to the content on and from those accounts.

Figure 2:
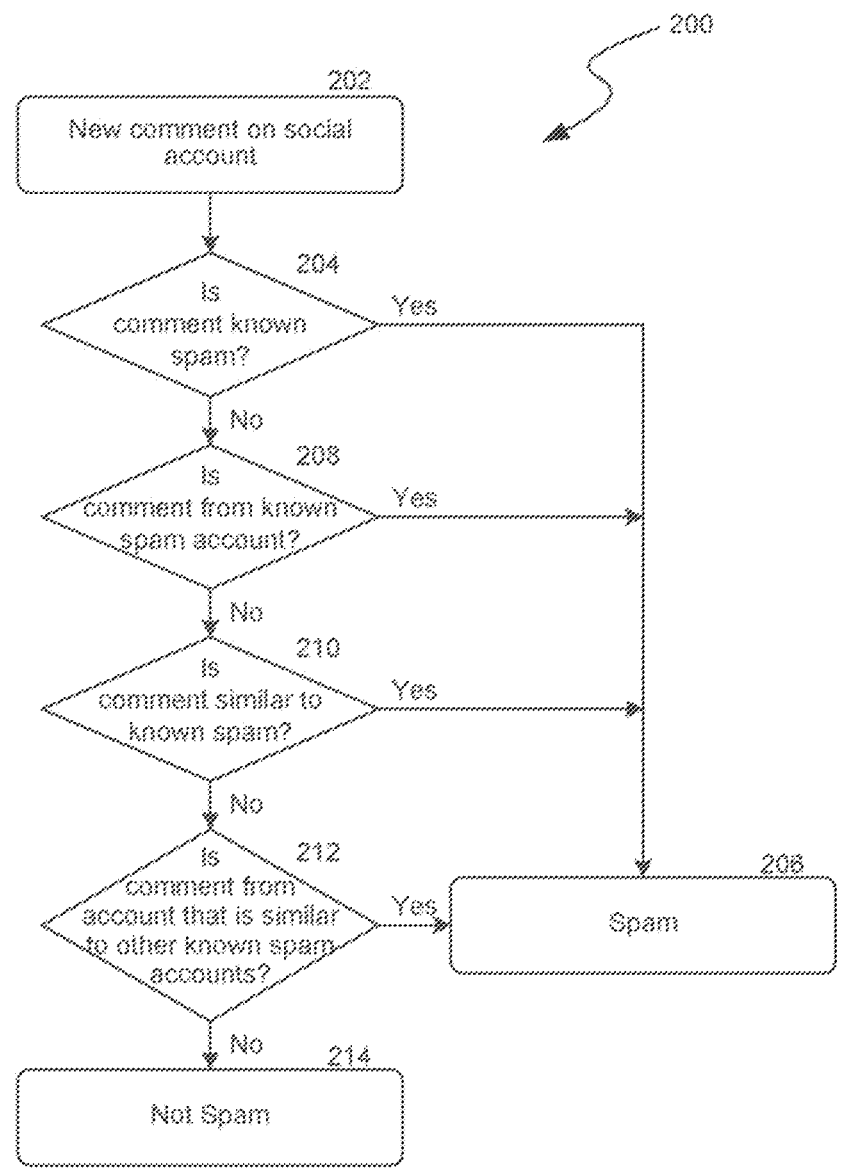
FIG. 2 is a flow diagram illustrating a routine invoked by the technology in various embodiments to classify postings made to a social network as spam in accordance with the present technology.

FIG. 2 is a flow diagram illustrating a routine 200 invoked by the technology in various embodiments to classify postings made to a social network as spam in accordance with the present technology. The routine begins at block 202 when a new comment on a first social account is detected by the classification engine 114. At decision block 204, the routine 200 determines whether the new comment is known spam data. As an example, if the comment is recognized as known spam, the classification engine 114 can mark the comment as spam at block 206. If the comment is not recognized as spam, the routine 200 determines whether the comment is from a known spam social account at decision block 208. If the routine 200 determines that the first social account posting the comment is a known spam account, the comment can be flagged as spam at block 206. If the first social account posting the comment is not a known spam account, the routine 200 continues at decision block 210 when the routine determines if the comment includes content data similar to spam data. If the routine 200 determines the posted comment is similar to spam, the comment is marked as spam at block 206. If the content data of the posted comment is not similar to known spam data, the routine continues at decision block 212. At decision block 212, the routine 200 determines whether the first social account posting the comment is similar to another known spam account. If the first social account is similar to a known spam account, the comment is flagged as spam at block 206. If the first social account posting the comment is not similar to a known spam account, the routine determines that the comment is not spam at block 214. The routine 200 may be invoked at regular time intervals, random time intervals, upon detection that content (e.g., a comment, posting, etc.) has been uploaded to a social network or is about to be uploaded to a social network, etc. In various embodiments, the routine 200 invokes APIs relating to the social networks or APIs relating to content publication tools. In various embodiments, the technology and the routine 200 may be invoked by social networks or content publication tools, e.g., as part of an extension provided by the social networks or publication tools.

Those skilled in the art will appreciate that the logic illustrated in FIG. 2 and described above may be altered in a variety of ways. For example, the order of the logic may be rearranged, substeps may be performed in parallel, illustrated logic may be omitted, other logic may be included, etc.

Referring back to FIG. 1, the inference engine 112 can also be configured to evaluate the frequency of profanity and/or hateful speech (e.g., abusive speech) present in the social data posted by a first social account to determine if the first social account should be blocked from further postings and/or posting any social data on any other social account (e.g., a second social account, a third social account, etc.). Once the inference engine 112 makes this determination, the inference engine 112 can be configured to inform the classification engine 114 to take one or more actions, and to apply rules to all social data classified by the system 106 as containing profanity and/or hateful speech, as described above with respect to the identification and classification of spam data. For example, the classification engine 114 can classify social data as abusive speech if the social data meets one or more of the following criteria: (1) consider all social data subsequently posted by the first social account as inappropriate; (2) change sensitivity to abusive speech classification on subsequent social data posted by the first social account; (3) consider subsequent social data that is the same or similar to the social data posted by the first social account to contain abusive speech regardless of which other social account posts it; and/or (4) consider social data posted by other social accounts (e.g., a second social account, a third social account, etc.) that is the same or similar to the observed first social account as abusive speech.

In addition to classifying and applying rules to spam data and abusive speech, the present technology can also be configured to address and classify other forms of social data including, but not limited to, malware, bullying, fraudulent activity, potentially violent speech, sexually predatory activity, etc. For example, in other embodiments of the present technology, the inference engine 112 evaluates linked content (e.g., by URL links) in the social data. If the linked content is determined or classified to be malware, then the inference engine 112 determines that any subsequent social data that also links to the linked malware content is malicious. If the percentage of malicious social data posted by a social account reaches a specified threshold, then the inference engine 112 infers that any subsequent social data or URL links posted from that social account will be malicious and updates instructions to the classification engine 114 accordingly.

In further embodiments of the present technology, the inference engine 112 evaluates activity of other applications (e.g., social publishing apps such as Hootsuite™, Sprinklr®, Spredfast®, or other publisher that posts content on behalf of social network users) that use a social networking platform's APIs. If the social data posted by the application is classified as spam, malicious, abusive or in any other way unwanted (e.g., unwanted data) by users of the social networking platform, or if the social data posted by the application is automated so as to occur at a higher frequency than would be possible if generated by actual user activity, the inference engine 112 can be configured to determine that all subsequent social data posted to any social account from that application is classified as unwanted data and updates instructions to the classification engine 114 accordingly.

Figure 3:
FIG. 3 is a user interface diagram illustrating a user interface for enabling users to specify social account participants and social media content rules that can be applied to social data provided by the participants in various embodiments.

FIGS. 3 and 4 are user interface diagrams illustrating user interfaces 300 and 400, respectively, for enabling users to interact with various embodiments of the environment 100 such as to specify and/or control a set of rules and/or polices to apply to one or more social accounts. In various embodiment, the user interfaces 300, 400 can be presented in a Web browser, standalone application, applet, etc. The social accounts can be from any social networking platform and are defined as a set of social accounts separately from the rules that combine to form a social data classification policy as described above. For example, FIG. 3 illustrates the user interface 300 in which a commenters list can be controlled by a user of the system for a particular social account or across a set of social accounts operated by the user. In one embodiment, a user of the system can select a social media participant or a participants' social media account (e.g., social media presence) and define one or more rules to associate with that participant (e.g., blocked, watched, allowed, etc.). If the system classifies a social data entry as a content incident (e.g., flags a comment as spam, abusive speech, etc.), a user or social media account owner can interface with the system at user interface 400 (FIG. 4) to specify which action, if any, the user would like to assign to flagged social data entry. For example, the user can take actions with regard to the commentator or social media participant (e.g., add commenter to a watch list, add commenter to a block list), or can take action with respect to a particular comment or social data entry (e.g., post response, remove response, ignore incident, ignore all similar future incidents, etc.).

In some embodiments, the inference engine 112 can adopt to a user's input to modify an operation. For example, if a user decides to put a commenter's social account on a watch list or block list, the inference engine 112 can be configured to alter rules that are applied to similar subsequent social data classifications made by the system. In another example, if the user elects to reassign a system classification of a social data entry and "ignore" the social data entry, the inference engine 112 can be configured to alter rules that are applied to similar subsequent social data classifications made by the system.

Accordingly, various embodiments of the technology can be adapted to involve or incorporate user interaction or input at any step in the process of scanning, classifying, storing, inferring and/or updating classification rules. In other embodiments, the technology may be automated.

In several embodiments, the system can be configured to scan and classify social media data and content on a continuous and/or intermittent basis (e.g., over minutes, hours or days). In some embodiments, the social media content may be evaluated, classified, and acted upon in real-time as the scanning engine 108 retrieves the social data from the social networks' APIs. In other embodiments, the social media content can be collected and stored (e.g., by the scanning engine 108 and storage engine 110, respectively), and the content can later be evaluated, classified and acted upon, for example, in an off-line setting.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

What is claimed is:

1. A method, comprising:
   detecting, by a computer, a comment posted, uploaded, or being posted or uploaded to a first social account of a social network on Internet;
   determining, by the computer, whether the comment is recognizable as known undesirable content;
   responsive to a determination that the comment is not recognizable as known undesirable content, determining, by the computer, whether the comment is from a known undesirable source;
   responsive to the comment not being from a known undesirable source, determining, by the computer, whether the comment contains content similar to undesirable content;
   responsive to the comment not being from a known undesirable source and not containing content similar to undesirable content, determining, by the computer, whether a source of the comment is similar to any known undesirable source;
   responsive to the source of the comment not being similar to any known undesirable source, and the comment not being from a known undesirable source, not containing content similar to undesirable content, and not recognizable as known undesirable content, flagging or marking, by the computer, the comment as not undesirable content; and
   responsive to the source of the comment being similar to any known undesirable source, or the comment being from a known undesirable source, containing content similar to undesirable content, or being recognizable as known undesirable content, flagging or marking, by the computer, the comment as undesirable content.

2. The method according to claim 1, further comprising:
   responsive to the comment being flagged or marked as undesirable content, performing at least one of:
   classifying social data subsequently posted by the source of the comment to the first social account as undesirable content;
   changing a sensitivity to undesirable content classification on subsequent social data posted by the source of the comment to the first social account;
   classifying subsequent social data that is same or similar to the comment posted to the first social account as containing undesirable content regardless of source; or
   considering subsequent social data posted to the first social account, by any source that is same or similar to the source of the comment, as containing undesirable content.

3. The method according to claim 1, wherein the source of the comment comprises the first social account, another social account of the social network, or a third-party application posting on behalf of the first social account.

4. The method according to claim 1, further comprising:
   evaluating, by an inference engine relative to a specified threshold, a frequency or percentage of undesirable content present in the social data posted by the first social account;
   based on the evaluating, determining, by the inference engine, that undesirable content is present in the social data posted by the first social account;
   responsive to a determination that undesirable content is present in the social data posted by the first social account, informing, by the inference engine, a classification engine to take one or more actions or apply one or more rules to all social data classified by the classification engine.

5. The method according to claim 4, wherein the classification engine is adapted to perform at least one of:
   classifying social data subsequently posted by the source of the comment to the first social account as undesirable content;
   changing a sensitivity to undesirable content classification on subsequent social data posted by the source of the comment to the first social account;
   classifying subsequent social data that is same or similar to the comment posted to the first social account as containing undesirable content regardless of source; or
   considering subsequent social data posted to the first social account, by any source that is same or similar to the source of the comment, as containing undesirable content.

6. The method according to claim 1, wherein the undesirable content comprises at least one of: spam, linked content containing a universal resource locator, profanity, abusive speech, malware, bullying content, fraudulent activity, potentially violent speech, sexually predatory activity, or malicious content.

7. The method according to claim 1, further comprising:
   performing the detecting at a regular time interval, at a random time interval, upon detection of new content being posted or uploaded or about to be posted or uploaded to the first social account via an application programming interface of the social network on the Internet.

8. A system, comprising:
   a processor;
   a non-transitory computer-readable medium; and
   stored instructions translatable by the processor for:
   detecting a comment posted, uploaded, or being posted or uploaded to a first social account of a social network on Internet;

determining whether the comment is recognizable as known undesirable content;

responsive to a determination that the comment is not recognizable as known undesirable content, determining whether the comment is from a known undesirable source;

responsive to the comment not being from a known undesirable source, determining whether the comment contains content similar to undesirable content;

responsive to the comment not being from a known undesirable source and not containing content similar to undesirable content, determining whether a source of the comment is similar to any known undesirable source;

responsive to the source of the comment not being similar to any known undesirable source, and the comment not being from a known undesirable source, not containing content similar to undesirable content, and not recognizable as known undesirable content, flagging or marking the comment as not undesirable content; and responsive to the source of the comment being similar to any known undesirable source, or the comment being from a known undesirable source, containing content similar to undesirable content, or being recognizable as known undesirable content, flagging or marking the comment as undesirable content.

9. The system of claim 8, wherein the stored instructions are further translatable by the processor for:

responsive to the comment being flagged or marked as undesirable content, performing at least one of:

classifying social data subsequently posted by the source of the comment to the first social account as undesirable content;

changing a sensitivity to undesirable content classification on subsequent social data posted by the source of the comment to the first social account;

classifying subsequent social data that is same or similar to the comment posted to the first social account as containing undesirable content regardless of source; or considering subsequent social data posted to the first social account, by any source that is same or similar to the source of the comment, as containing undesirable content.

10. The system of claim 8, wherein the source of the comment comprises the first social account, another social account of the social network, or a third-party application posting on behalf of the first social account.

11. The system of claim 8, wherein the stored instructions are further translatable by the processor for:

evaluating, by an inference engine relative to a specified threshold, a frequency or percentage of undesirable content present in the social data posted by the first social account;

based on the evaluating, determining, by the inference engine, that undesirable content is present in the social data posted by the first social account;

responsive to a determination that undesirable content is present in the social data posted by the first social account, informing, by the inference engine, a classification engine to take one or more actions or apply one or more rules to all social data classified by the classification engine.

12. The system of claim 11, wherein the classification engine is adapted to perform at least one of:

classifying social data subsequently posted by the source of the comment to the first social account as undesirable content;

changing a sensitivity to undesirable content classification on subsequent social data posted by the source of the comment to the first social account;

classifying subsequent social data that is same or similar to the comment posted to the first social account as containing undesirable content regardless of source; or considering subsequent social data posted to the first social account, by any source that is same or similar to the source of the comment, as containing undesirable content.

13. The system of claim 8, wherein the undesirable content comprises at least one of: spam, linked content containing a universal resource locator, profanity, abusive speech, malware, bullying content, fraudulent activity, potentially violent speech, sexually predatory activity, or malicious content.

14. The system of claim 8, wherein the stored instructions are further translatable by the processor for:

performing the detecting at a regular time interval, at a random time interval, upon detection of new content being posted or uploaded or about to be posted or uploaded to the first social account via an application programming interface of the social network on the Internet.

15. A computer program product comprising a non-transitory computer-readable medium storing instructions translatable by a processor for:

detecting a comment posted, uploaded, or being posted or uploaded to a first social account of a social network on Internet;

determining whether the comment is recognizable as known undesirable content;

responsive to a determination that the comment is not recognizable as known undesirable content, determining whether the comment is from a known undesirable source;

responsive to the comment not being from a known undesirable source, determining whether the comment contains content similar to undesirable content;

responsive to the comment not being from a known undesirable source and not containing content similar to undesirable content, determining whether a source of the comment is similar to any known undesirable source;

responsive to the source of the comment not being similar to any known undesirable source, and the comment not being from a known undesirable source, not containing content similar to undesirable content, and not recognizable as known undesirable content, flagging or marking the comment as not undesirable content; and responsive to the source of the comment being similar to any known undesirable source, or the comment being from a known undesirable source, containing content similar to undesirable content, or being recognizable as known undesirable content, flagging or marking the comment as undesirable content.

16. The computer program product of claim 15, wherein the instructions are further translatable by the processor for:

responsive to the comment being flagged or marked as undesirable content, performing at least one of:

classifying social data subsequently posted by the source of the comment to the first social account as undesirable content;

changing a sensitivity to undesirable content classification on subsequent social data posted by the source of the comment to the first social account;

classifying subsequent social data that is same or similar to the comment posted to the first social account as containing undesirable content regardless of source; or considering subsequent social data posted to the first social account, by any source that is same or similar to the source of the comment, as containing undesirable content.

17. The computer program product of claim 15, wherein the source of the comment comprises the first social account, another social account of the social network, or a third-party application posting on behalf of the first social account.

18. The computer program product of claim 15, wherein the instructions are further translatable by the processor for:

evaluating, by an inference engine relative to a specified threshold, a frequency or percentage of undesirable content present in the social data posted by the first social account;

based on the evaluating, determining, by the inference engine, that undesirable content is present in the social data posted by the first social account;

responsive to a determination that undesirable content is present in the social data posted by the first social account, informing, by the inference engine, a classification engine to take one or more actions or apply one or more rules to all social data classified by the classification engine, wherein the classification engine is adapted to perform at least one of:

classifying social data subsequently posted by the source of the comment to the first social account as undesirable content;

changing a sensitivity to undesirable content classification on subsequent social data posted by the source of the comment to the first social account;

classifying subsequent social data that is same or similar to the comment posted to the first social account as containing undesirable content regardless of source; or considering subsequent social data posted to the first social account, by any source that is same or similar to the source of the comment, as containing undesirable content.

19. The computer program product of claim 15, wherein the undesirable content comprises at least one of: spam, linked content containing a universal resource locator, profanity, abusive speech, malware, bullying content, fraudulent activity, potentially violent speech, sexually predatory activity, or malicious content.

20. The computer program product of claim 15, wherein the instructions are further translatable by the processor for:

performing the detecting at a regular time interval, at a random time interval, upon detection of new content being posted or uploaded or about to be posted or uploaded to the first social account via an application programming interface of the social network on the Internet.

* * * * *